United States Patent [19]

Blake

[11] Patent Number: 4,760,759

[45] Date of Patent: Aug. 2, 1988

[54] GEARED RATIO COUPLING

[76] Inventor: William L. Blake, 4121 NE. 26th Ave., Fort Lauderdale, Fla. 33308

[21] Appl. No.: 852,235

[22] Filed: Apr. 15, 1986

[51] Int. Cl.[4] .............................................. F16H 1/28
[52] U.S. Cl. .................................... 74/804; 74/606 A
[58] Field of Search .............. 74/804, 805, 390, 606 A

[56] References Cited

U.S. PATENT DOCUMENTS

| | | | |
|---|---|---|---|
| 2,091,317 | 8/1937 | Hill | 74/462 |
| 2,966,808 | 1/1961 | Grudin | 74/805 X |
| 3,026,809 | 3/1962 | Anderson et al. | 74/462 X |
| 3,056,315 | 10/1962 | Mros | 74/805 |
| 3,074,294 | 1/1963 | Woolley | 74/805 X |
| 3,146,638 | 9/1964 | Peras | 74/804 X |
| 3,413,896 | 12/1968 | Wildhaber | 74/805 X |
| 3,425,620 | 2/1969 | Thornton | 74/804 X |
| 3,619,093 | 11/1971 | Harle et al. | 418/133 X |
| 3,965,774 | 6/1976 | Omi et al. | 74/805 |
| 4,005,619 | 2/1977 | Schmermund | 74/804 |
| 4,023,441 | 5/1977 | Osterwalder | 74/805 |
| 4,398,874 | 8/1983 | Eisenmann | 74/804 X |
| 4,446,752 | 5/1984 | Shaffer et al. | 74/801 X |
| 4,523,632 | 6/1985 | Nobukawa et al. | 74/606 A X |
| 4,545,263 | 10/1985 | Fickelscher | 74/804 X |

FOREIGN PATENT DOCUMENTS

| | | | |
|---|---|---|---|
| 2503908 | 8/1975 | Fed. Rep. of Germany | 74/804 |
| 2138098 | 10/1984 | United Kingdom | 74/805 |
| 1017865 | 5/1983 | U.S.S.R. | 74/804 |

Primary Examiner—Leslie A. Braun
Assistant Examiner—David Novais

[57] ABSTRACT

This invention pertains to gear reducers using the nutating principle. The tooth form is epicycloidal, but with the root or stem of the tooth also epicycloidal so that tooth contact between meshing teeth is essentially for one hundred eighty degress of arc of tooth contact with a uniting rather than a separating force. This tooth formation is used with a pinion beam rather than a pinion with two areas of teeth. This pinion beam has two rows of gear teeth with a relief therebetween for oil circulation. Cooling fins are provided on the housing which has a mechanism for restraining the rotational movement of the outer housing.

5 Claims, 6 Drawing Sheets

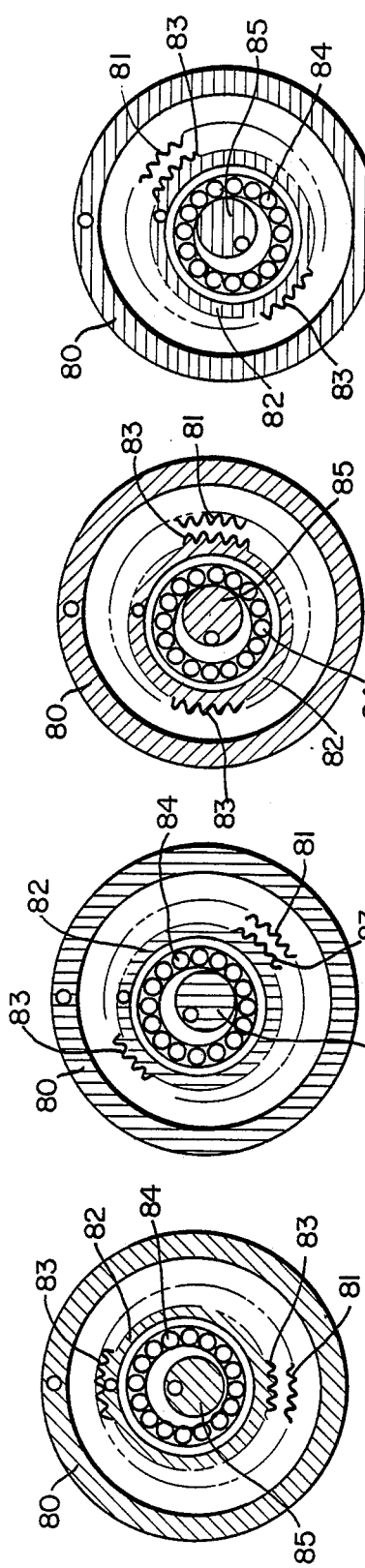
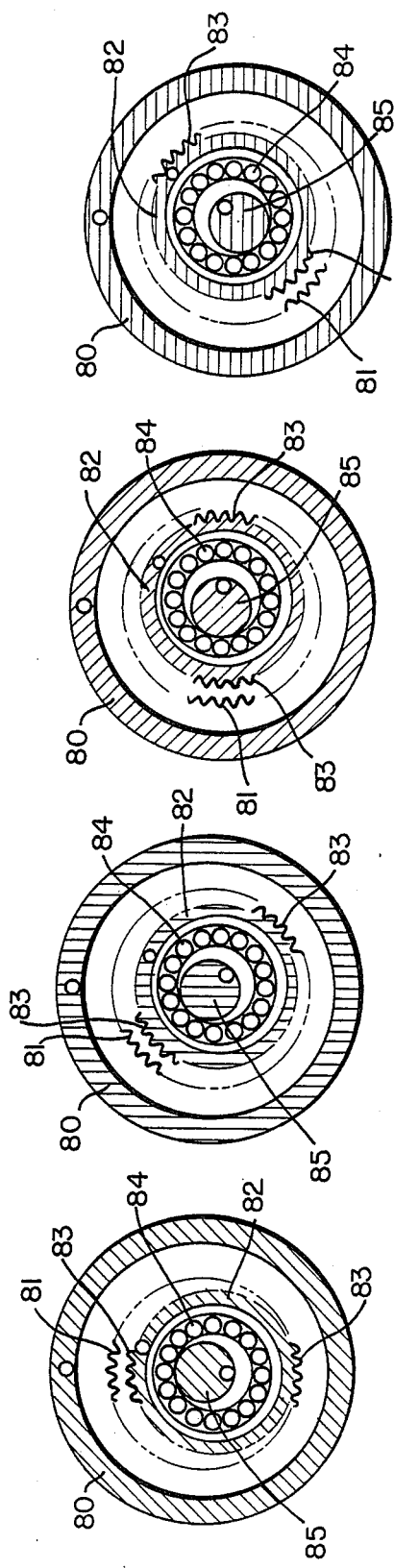

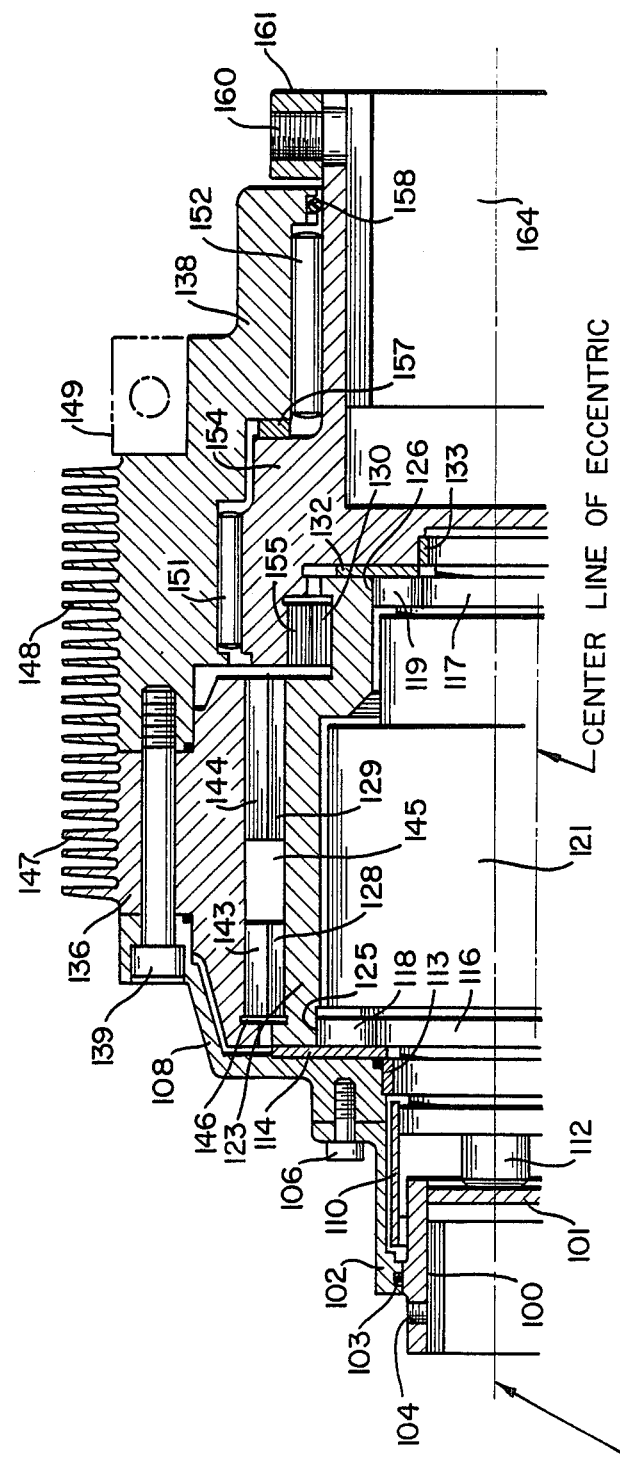

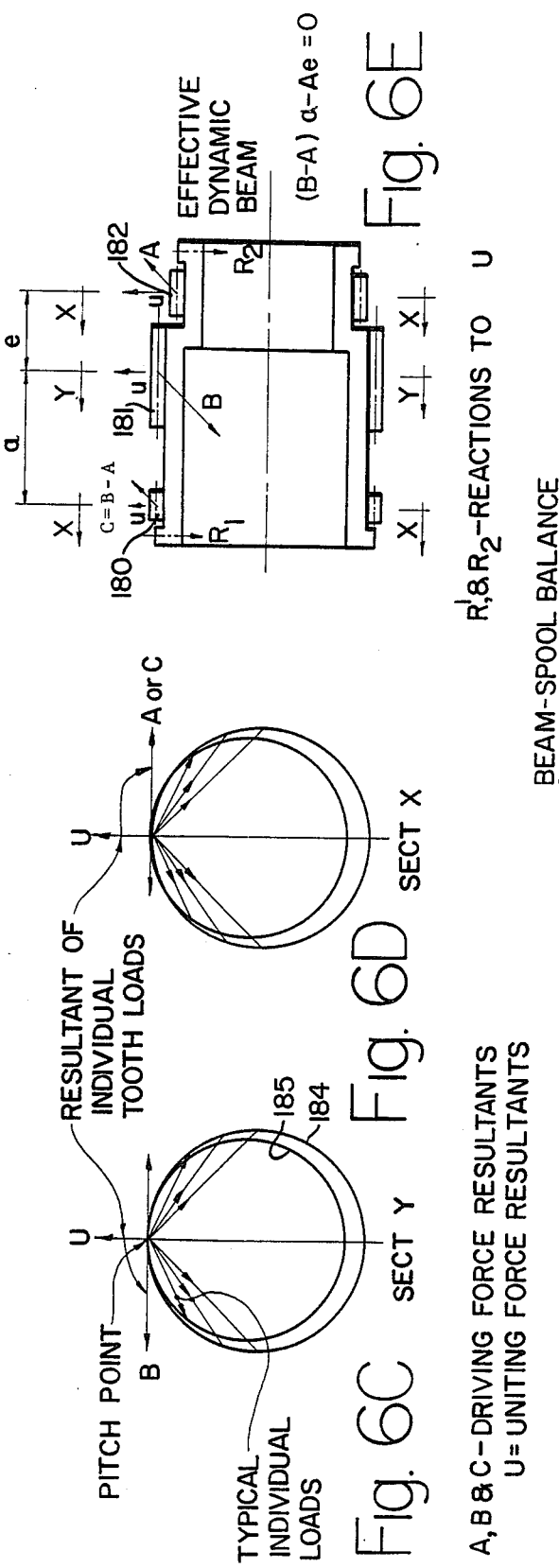
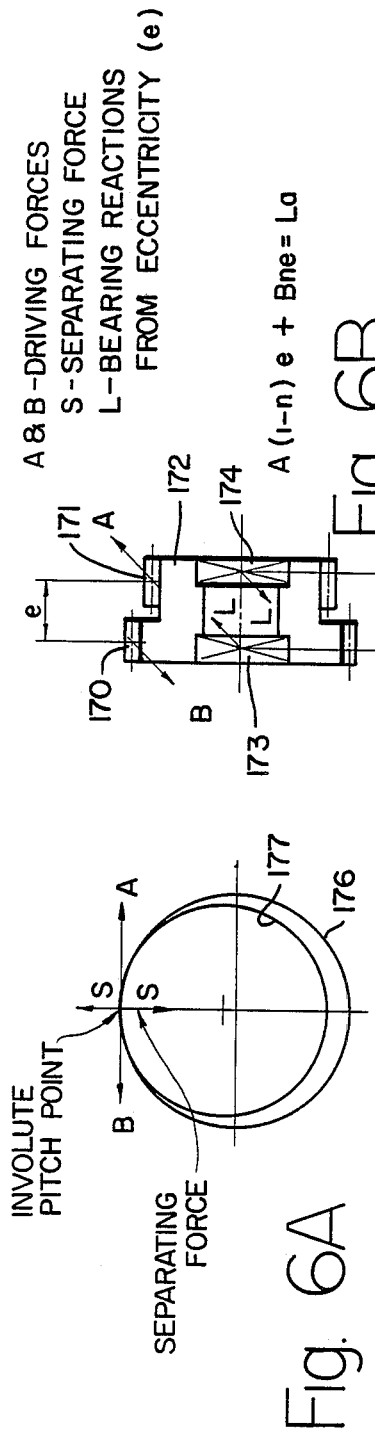

GEARED RATIO COUPLING

BACKGROUND OF THE INVENTION

1. Field of the Invention

The field of the invention as established in and by the United States Patent Office is believed to be found in gear reducers and in particular those using cycloid gearing and operation. This gear reducer of this invention pertains to reductions as low as 3.4 to as high as 7569 to one with compactness, lightness, high efficiency and low heat. A special nutating internal member and a special tooth form are used to provide the efficiency of operation.

2. Description of the Prior Art

Gear reducers are well known and are provided with drive means to change speeds of the input device to a desired output speed. There are many types of reducers, including parallel shaft gearing, bevel gearing, compound gearing, worm gearing and planetary gearing. In ordinary parallel shaft gear practice, it is reasonable to handle ratios from 1:1 to about 8:1 in a single reduction. A ratio of 120:1 requires a triple reduction unit which has three sets of pinions and gears or a total of six toothed parts. With a worm set (non-intersecting and angled) it is possible to handle 100:1 or more in a single reduction with only two toothed parts, but efficiency is low and the heat generation is high. Planetary concentric shaft drives range from 1.2:1 to 25:1.

Conventional gear drives incorporate involute generated tooth forms because of their interchangeability and because they do not ordinarily require as stringent a manufacturing tolerance. Another related type of concentric shaft speed changer incorporates a special tooth form known as cycloidal. With this form of tooth generation, contact between teeth occurs over an effective arc of 90 degrees to 120 degrees rather than the 7 degrees to 20 degrees for the conventional involute gear form. Precision of cycloid gearing manufacture is more demanding, but with modern machine technologies the advantages far outweigh the cost. These advantages include much smaller, lighter, quieter and more efficient transmission units because of their longer arc of engagement.

CYCLOIDAL

Cycloidal speed changers are arranged in-line, that is, concentric. They are not really gear drives, however, although so designated. Cycloidal speed reducers are commonly designated as such because they incorporate cycloidal-type cams or lobes with which cyclindrical pins or rollers mesh. They do not incorporate gear teeth of cycloidal form. They perform precisely the same function as planetary gear reducers. They are a relatively new form of reducer.

The cycloidal type of drive is a differential speed changer so named because the ratio does not evolve from the ratio of gear diameters, but from the ratio of the difference of diameters. The cycloidal type utilizes trochoidally (a special form of cycloid) generated cam lobes on a driving wheel, or wheels, operating against circular rollers and/or pins. The difference between the number of rollers and the number of cam lobes is usually one.

Contemporary cycloidal type differential reducers include those manufactured by Sumitoma Corp. (Japan) known as the SM Cyclo, the Orbidrive manufactured by Compudrive Corp. and the so-called Circulate reducer manufactured by the Graham Company. Conventional cycloidal reducers consist of a pair of discs which oscillate radially on eccentrics of the input shaft at input shaft speed. The eccentrics are 180 degrees out-of-phase. Except for the axial displacement of the discs, force and inertia balance the system. Each disc is circumscribed with recurrent cycloidal cam lobes and each disc has six or more equally-spaced open pin holes at about midradius from input shaft center bore to cam lobe pitch radius. Cam lobes engage pins in one design and roller pins in other designs. There is one less cam lobe than there are pins. The engagement between pins and lobes is such that there is an effective driving contact over a 90 degree to 120 degree arc. For each oscillation of the discs at the rate of input shaft rotation, the discs advance one tooth. If there are, for example, 11 lobes on the discs, the input shaft will rotate 11 turns for 1 turn of the discs. The ratio is 11:1.

As the discs rotate, they carry with them through their 6 or more midradius pin holes, the equal number of pins or roller pins attached to and extending from a flange of the output shaft. In this manner, the output shaft rotates at the same rate as the discs to complete the transmission. Through the use of the out-of-phase discs, internal loads on the output shaft are balanced as they are on the input shaft. Although inertia balance exists, a matter of significant concern is that the heavy output loads on the input shaft eccentrics still impose considerable friction loads on the input shaft at the higher speed. This is an inherent and unavoidable fault of previously known contemporary cycloidal reducers.

The ratio can range practically from about 6:1 to 87:1 according to the manufacturers. Higher ratios are obtained by series compounding of single reductions, thus $87 \times 87$ equals 7,569:1 which can be achieved in a double reduction, or 658,503 in a triple reduction by compounding.

One reducer of this configuration uses what the manufacturer calls a circulute lobe formation instead of pure cycloidal. It accomplishes the same result as the cycloidal lobe reducer. However, the manufacturer claims somewhat higher power capacity for it.

A pre-Ex search was made in the art and, as noted above, many gear reducers, with or without associated motor means, have been the subject of patents. Among those in the field of cycloid actuation are U.S. Pat. No. 2,091,317 to HILL, as issued Aug. 31, 1937, which shows a tooth curve and the speed reducer employs a gear and pinion. U.S. Pat. No. 3,026,809 to ANDERSON et al, as issued Mar. 27, 1962, also shows a gear and pinion in the same plane. U.S. Pat. No. 3,413,896 to WILDHABER, as issued Dec. 3, 1968, shows two rows of gearing with angled teeth. U.S. Pat. No. 3,619,093, as issued to HARTE on Nov. 9, 1971, shows a gear and pinion in the same plane. U.S. Pat. No. 4,023,441, as issued to OSTERWALDER on May 17, 1977, shows two gears and two pinions arrayed to provide a rotatable output shaft. U.S. Pat. No. 4,446,752, as issued to SHAFFER et al on May 8, 1984, shows two different size gears and pinions, with the output shaft driven by the smaller gear system.

The present invention for the speed changing ratio coupling has a floating beam pinion spool which, although similar to a single nutating planetary reducer, has its inertia balanced by a counterweight on the input shaft. The axial loads are substantially completely balanced by the floating beam pinion spool configuration.

This arrangement and construction accepts the very high eccentric output loads entirely within the tooth contact system. No ineffective ancillary means are required.

SUMMARY OF THE INVENTION

This invention may be summarized, at least in part, with reference to its objects. It is an object of this invention to provide, and its does provide, a gear reducer which uses a like gear tooth form for all gears. The apparatus employs a cycloidal tooth form for both gear and pinion. It also has an in-line configuration the same as the planetary drive and other cycloidal drives. It retains all of the advantages of the other cycloidal drives, including lightness, quietness, long wear life and symmetry of design. It does not, however, have the disadvantage of ordinary cycloidal differential reducers in that the very high output tooth loads are not imposed upon the high speed input shaft components and frictional energy is, thus, not expended at high speed. Also, the pitch point of contact, because both gear and pinion are cycloidal, is at the pitch circle of the pinion—not at approximately 2/3 of the pitch radius as with ordinary cycloidal differential reducers. The size of the reducer to transmit the same power is, thus, smaller and more compact.

To accomplish this, the gear reducer of this invention incorporates a floating beam spool having high output load contact with only the housing and the output shaft. The design also removes any limit on power capacity. The pinion spool is a cylindrical overhung beam with which one long divided pinion face operates against a long divided housing gear face and a short pinion face at the end of the spool operates against an internal flanged gear of the output shaft. Because of the cyclomesh tooth form, the spool is able to seek a moment balance between the divided housing contact paths and the eccentric overhung moment created by the contact path at the output shaft flange independent of the input shaft. Unbalanced output torques are taken directly by the housing through needle bearings on the output shaft and at the periphery of the output gear flange. Radial inertia balance of the nutating pinion spool is provided by a small eccentric counterweight attached to the input shaft and inside the spool.

There is only one configuration for a full range of ratios from about 3.4:1 to 7569:1. No compounding of the gears is necessary for this range of ratios. The difference in number of teeth between gear and pinion is not limited to one as with conventional cycloidal reducers, but can be four or more. The ratio formula is as follows:

$$R \text{ equals } \frac{Ng2 \times Np1}{Ng2 \times Np1 - Ng1 \times Np2}$$

Where
R equals ratio
Ng1 equals ratio number of teeth on gear 1
Ng2 equals ratio number of teeth of gear 2
Np1 equals ratio number of teeth of pinion 1
Np2 equals ratio number of teeth of pinion 2

The low ratio limit given above is based on a five-tooth output pinion (Np2) and an input pinion (Np1) of twice the size of the output pinion, which appears to be a practical limit even though a larger input pinion is possible.

When gear and pinion numbers of teeth are selected such that the denominator equals 1, then the high ratio limit (R equals Ng2×Np1) is attained and is slightly higher than attainable with the double reduction compounded conventional cycloidal reducers. Beyond this ratio, one compounding of the geared ratio coupling will practically produce reductions of unlimited magnitude at higher than usual efficiency.

A small degree of backlash is generally desirable in any reducer. However, for precise control or timing applications, backlash in this geared ratio coupling can be reduced to and positively maintained at zero through the application of spring preloading.

In addition to the above summary, the following disclosure is detailed to insure adequacy and aid in understanding of the invention. This disclosure, however, is not intended to cover each new inventive concept no matter how it may later be disguised by variations in form or additions of further improvements. For this reason, there has been chosen a specific embodiment of geared ratio coupling as adopted for use as a speed reducer or increaser and showing a preferred means for constructing the ratio coupling. This specific embodiment has been chosen for the purposes of illustration and description as shown in the accompanying drawings wherein:

BRIEF DESCRIPTION OF THE DRAWINGS

FIGS. 4A through 4H represent diagrammatic sectional views showing the coupling apparatus in one-eighth increments of revolution advance;

FIG. 5 represents a sectional side view of a geared ratio coupling similar to that of FIG. 1, but with the pinion spool carried by input rollers and diagrammatically indicating variations of construction that may be employed, and FIGS. 6A through 6E represent diagrams that illustrate the forces occurring within the pinion spool and the gear teeth thereon when in mesh actuation with gear teeth on the housing and output shaft.

In the following description and in the claims, various details are identified by specific means for convenience. These names are intended to be generic in their application. Corresponding reference characters refer to like members throughout the several figures of the drawings.

The drawings accompanying, and forming part of, this specification disclose details of construction for the purpose of explanation, but structural details may be modified without departure from the concept and principles of the invention and the invention may be incorporated in other structural forms than shown.

EMBODIMENT OF FIGS. 1 AND 2

Figure 1:
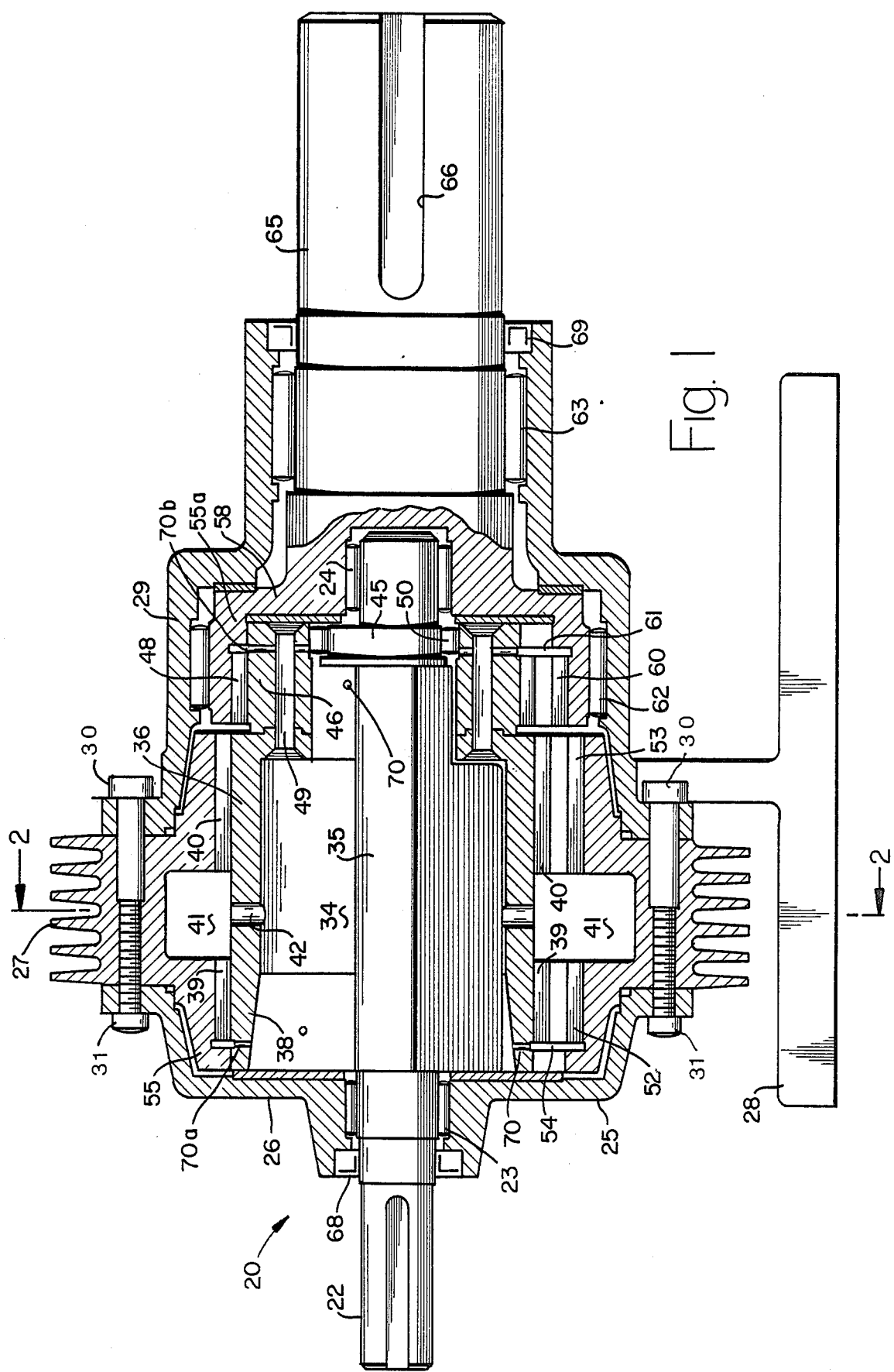
FIG. 1 represents a side sectional view, partly diagrammatic, and showing a split spool embodiment of a geared ratio coupling.
Figure 2:
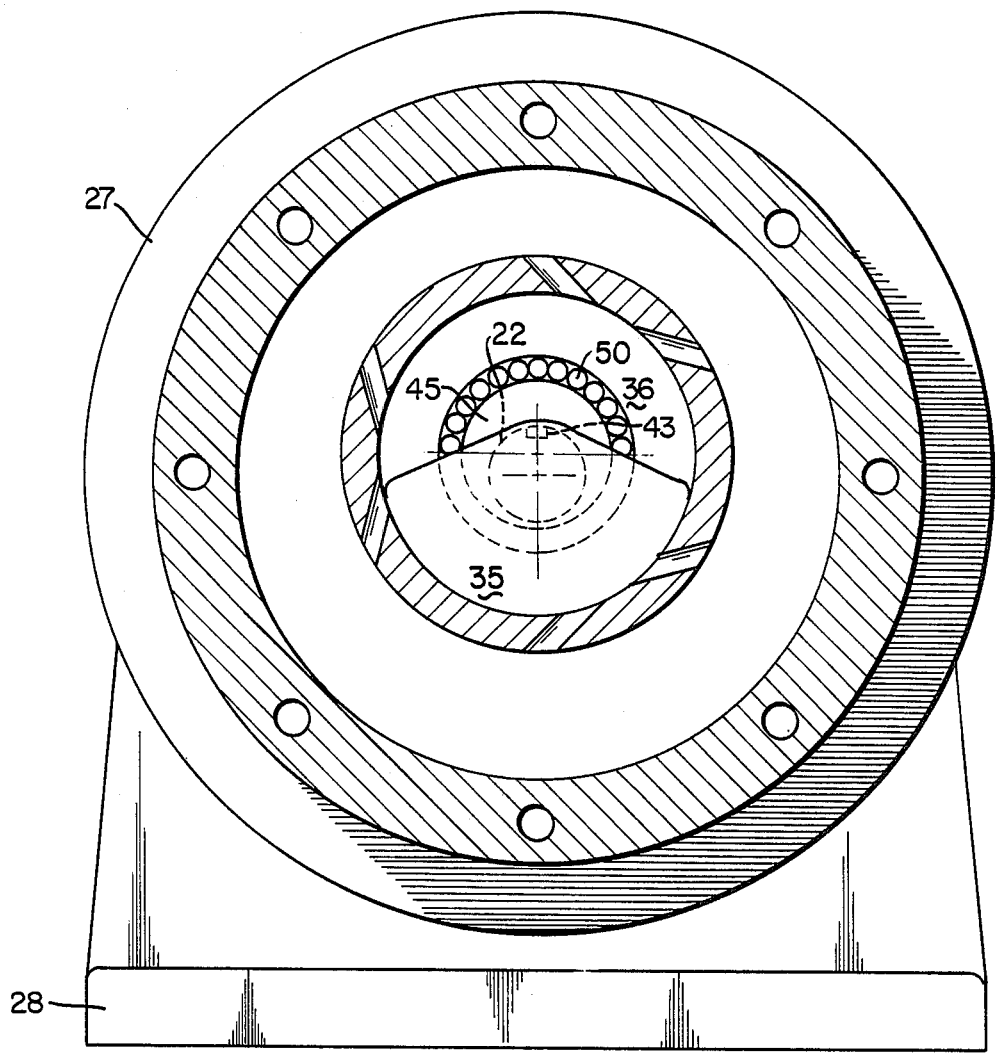
FIG. 2 represents a sectional view taken on the line 2—2 of FIG. 1 and looking in the direction of the arrows.

Referring next to the drawings and, in particular, to FIGS. 1 and 2, there is depicted one arrangement of a geared ratio reducer coupling and as illustrated having a reduction ratio of about one hundred to one. This assembly is generally identified as 20 and includes an input shaft 22 which has ground journals carried by needle bearings 23 and 24. Also seen is a fixed housing 25 having an input housing cap 26, a finned ring-like central portion 27, an output body portion 29 and which may include a base portion 28. For lower reduction ratios, the fins of the central portion may be omitted. Shoulder bolts and nuts 30 and 31 are shown as bringing and retaining cap 26, central portion 27 and output body portion 29 in an assembled condition.

The input shaft 22 has an enlarged central portion, generally identified as 34, and formed on the axis that is displaced (eccentric) from the axis of the input shaft and the journals carried by bearings 23 and 24. The displacement (eccentricity) is dependent upon the reduction ratio and the size of the reducer coupling. This enlarged portion may be integral, but also may be made with a separately assembled counterweight 35 to provide a balance of the spool eccentricity. The use of a counterweight enables the eccentric force to be adjusted by increasing or reducing the weight moment. This counterweight 35 is seen particularly in FIG. 2. This enlarged portion is revolved one hundred eighty degrees out-of-phase with the spool eccentricity as the input shaft 22 is rotated.

A pinion spool 36 may be of two portions or may be integrally formed. An enlarged internal portion 38 of said spool has two outwardly-extending portions on and in which are formed gear teeth 39 and 40 of like configuration. The shape of the teeth is detailed in FIG. 3. As depicted, the left gear portion 39 is of a lesser extent than the right portion 40. Between these gear portions is a relief area, identified as 41. In this relief portion and in other selected portions there is formed a multiplicity of radial holes, identified as 42, and providing for lubrication circulation. The holes may be angled if and when desired, with the number and angle a matter of selected design and use. This lubrication is both to and from the interior of the spool. The gear ratio reducer is shown with radial holes for lubrication, but it has been found that certain ratio reducers perform with acceptable heat increase without the use of circulation pathways. It is noted that if and when a counterweight 35 is employed as a separate member, the input shaft may be formed on a lathe with a keyway 43 in the intermediate portion and the counterweight is complementarily formed with a keyway to provide a determined positional securing.

It is to be noted that an eccentric portion 45 is secured to the shaft 22, one hundred eighty degrees out-of-phase with the counterweight 35, and provides a means, through rollers 50, of nutating spool 36 as the latter is supported by gear contacts 39, 40 and 48. The pinion spool 36, where made of two portions, has the forward (right) reduced diameter portion 46 on which a gear portion 48 is formed. If of two portions, this front portion is shouldered and is retained by a multiplicity of rivets 49. This front portion of the pinion spool is sized to receive a needle or like bearing 50 which is seated to the journal provided by eccentric ring 45. The pinion spool moves eccentrically in accordance with the offset of pinion portion 34 and eccentric ring portion 45 and moves counterflow to the rotational direction of the input shaft 22.

The central portion 27 is internally formed with two gear portions 52 and 53. There is a relief 54 indicated at the left end of gear 52, and to the left of this relief is an inwardly-directed flange 55 which is sized to define the internal diameter of the orbit of the pinion spool. This flange insures that the gear portions do not excessively mesh, but are maintained at a desired pitch line. The flange portion 55a provides and performs such a service at the right of gear portion 48. This ratio coupling has an output shaft, generally identified as 58, on which is formed inwardly-directed gear segment 60. This gear segment also has a relief 61 provided at its right end so that the gear teeth can be finished to their full length. To the right of this relief is an inwardly-directed flange 55a. The flanges 55 and 55a are depicted as extending inwardly directed only to the pitch radius of the gear. Similar separable outwardly-directed flanges are provided at the right and left ends of the spool extended to provide a mating support surface and maintain the pitch radius of the spool. By so doing, in certain circumstances, the definition of the diameter of the spool orbit is purely rolling without sliding actuation. Radial holes 70a and 70b as depicted may be angled so as to provide lubrication circulation passageways both from and to the interior of this spool. Roller bearings 62 are shown outside of gear segment portion 60 and roller (needle) bearing 63 carries the right end of the output shaft. This shaft is depicted as having an extending portion 65 having a keyway 66 therein.

As this ratio coupling has a determined quantity of lubricating oil therein, retention is contemplated to be provided by oil or grease shields 68 and 69. This lubrication is needed and desired so that the needle-type bearings are continuously lubricated and that the engaged gear teeth extents are likewise lubricated as they are in mesh. The internal eccentric force applied by the pinion portion 34 also requires lubrication as it is rotated. It is also contemplated that small holes 70 may be provided as a return oil conduit from the interior of the spool to the bearing 62, thence to the outer surface of the pinion spool to establish a flow path.

USE AND OPERATION OF EMBODIMENT OF FIGS. 1 AND 2

The input shaft 22 is rotated by a motor force, not shown, and at a selected speed, usually in the hundreds of r.p.m.'s. The enlarged central portion 34 engages the enlarged internal portion at one surface contact causing gear teeth 39 and 40 to engage and mesh with gear portions 52 and 53 formed and provided in central portion 27. The differential in teeth (at least one less) determines the ratio of reduction in a rotation. As shown, the right end of the pinion having gear teeth 48, although having the same tooth formation as gears 39, 40, 52 and 53, has fewer teeth. As the pinion is slowly advanced, the teeth of the gear 48 engage the teeth 60 of the output shaft 58. The depicted apparatus has the teeth 39 and 40 to be forty in number and the mating teeth 52 and 53 to be forty-four in number. The output teeth 48 on the pinion are thirty-six in number and mesh with forty teeth on gear 60 on the output shaft. This produces a reduction of one hundred to one.

Assuming the depicted apparatus is substantially shown full size, the one hundred to one reduction, using an input of about one and one-quarter horsepower at 1750 rpm, produces an output load of 3600 pounds and a torque of 4100 inch pounds. The mechanical efficiency is about ninety-four percent. The weight is estimated at about twenty-six pounds and, with a foot base 28, about six pounds are added.

TOOTH PROFILE AS IN FIG. 3

Figure 3:
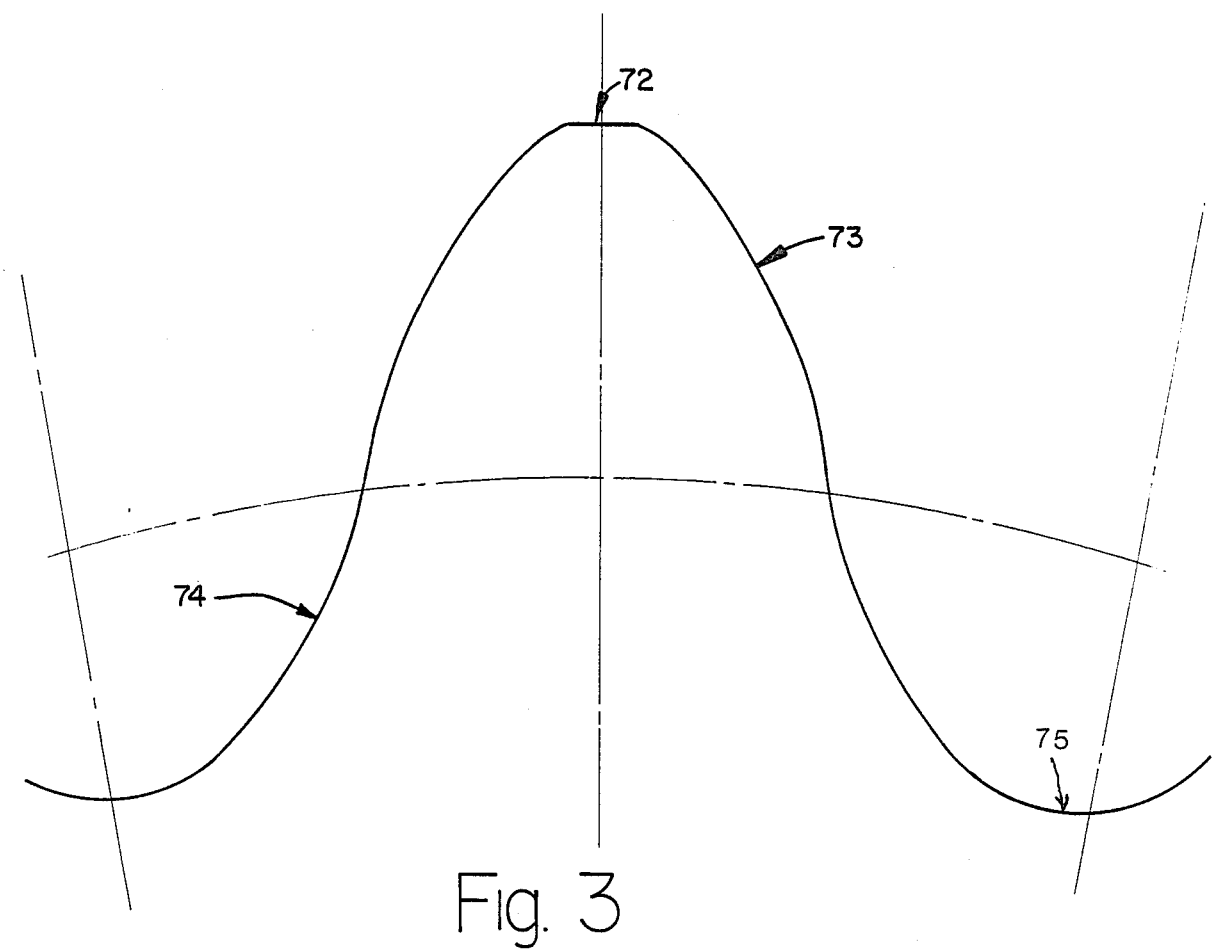
FIG. 3 represents a profile of the pinion tooth formation for the spur gears used in and with this ratio coupling.

In FIG. 3, the tooth formation is shown in a profile arrangement. It is to be noted that all gear teeth have the same configuration both for the pinion and for body tooth profile. These teeth use the cycloidal form but, at the pitch line where the tooth changes to flank, it is to be noted that this contact area is only from the tooth outwardly. It is to be noted that the extreme tip of the tooth is removed at 72 and the outer tooth profile (cycloidal) is identified as 73 and the flank is 74. The rounded trough, identified as 75, removes local stress areas and allows a smooth finishing of the gear profile.

EMBODIMENT OF FIGS. 4A through 4H

In FIGS. 4A through 4H is diagrammatically illustrated the action of the ratio reducer. For the purposes of designation, the outer body is 80, the inwardly-directed teeth formed thereon are 81, the pinion is 82, and the teeth thereon are 83. The input rollers are identified as 84 and the input shaft is 85. In FIG. 4A, the engagement of the teeth 81 and 83 is at the top (or twelve o'clock) position. The input shaft, which is of course axially located, has the enlarged eccentric also at the twelve o'clock position. For the purposes of this description, the input shaft is rotated counterclockwise. The pinion moves counter flow or, as depicted, clockwise.

In FIG. 4B, the input shaft 85 has moved forty-five degrees counterclockwise, causing the maximum meshing of the teeth 81 and 83 to move to this forty-five degree position as caused by the eccentric portion. In FIG. 4C, the input shaft 85 has been further rotated to ninety degrees from the position of FIG. 3A. The eccentric formation has caused the maximum meshing of gears 81 and 83 to occur at the nine o'clock position.

In FIG. 4D, the input shaft 85 has been rotated another forty-five degrees, now bringing the maximum meshing of the gears 81 and 83 to a position of one hundred thirty-five degrees. At FIG. 4E, the input shaft is shown as rotated another eighth of a revolution. The maximum mesh of gears 81 and 83 is at the bottom (or six o'clock) position. In FIG. 4F, the input shaft is shown further rotated "one" "eighth" revolution. The maximum mesh of the gears 81 and 83 is now at two hundred twenty-five degrees.

In FIG. 4G, the input shaft has been further rotated to bring the maximum meshing of gear portions 81 and 83 to the three o'clock position. This corresponds to a two hundred seventy degree rotation from the position of FIG. 4A. In FIG. 4H, the input shaft has been rotated further counterclockwise to bring the maximum meshing of the gears 81 and 83 to three hundred and fifteen degrees from the position of FIG. 4A. It is realized that the number of teeth in the gear 81 mut be more than the number of teeth in gear 83. Usually, the number or ratio of teeth produces one step of reduction and, as exemplified, the number of gear teeth in the inwardly-extending array 81 is forty-four to forty on gear 83 and the spool to the output shaft is forty to thirty-six teeth. This provides the desired or exemplified one hundred to one reduction.

ALTERNATE EMBODIMENT OF FIG. 5

In the embodiment depicted in FIG. 5, two sets of input rollers 118 and 119 are used to stabilize the spool 36 as may be required.

In this embodiment, the ratio coupling is made slightly more elaborate and both the input shaft and output shaft are contemplated to be an added external component that is secured in a coupling recess using a key or spline to insure positive shaping and rotation. As depicted, input is provided from a power source (usually an electric motor) to a sleeve retainer 100 having a closed end 101 to provide an exclusion of lubricating oil carried within the coupling. An outer retainer member 102 has a groove in which is retained an O-ring seal 103. A set screw 104 is carried in a threaded portion of sleeve 100 and is used to secure the power source shaft.

In a flange portion of retainer 102 are mounted a multiplicity of cap screws 106 which are inserted and tightened in threaded holes in an end cap 108. An input gear flexible coupling 110 is adapted to positively couple the retainer 100 to an input shaft 112. Seen also is a sleeve bearing 113 and a thrust washer 114. Input shaft 112 has left and right eccentric journal portions 116 and 117 formed on the same center line which is displaced from the common axis of the input and output shafts. These journal portions 116 and 117 engage and carry roller-type bearings identified as 118 and 119. A balance weight 121 is carried on and is secured to the input shaft 112. As the eccentric journal portions 116 are moved with the input shaft 112, a pinion spool 123 is moved in a circular displaced orbit. This pinion spool has an enlarged cavity within which the balance weight 121 moves. This pinion spool also has two finished interior diameters 125 and 126 adapted to engage respectively the rollers 118 and 119.

This floating pinion spool 123 has outwardly-extending gear teeth 128 and 129 which are cycloidal in configuration as depicted in FIG. 3. This pinion spool also carries and is formed with a gear portion 130 which is of smaller diameter and fewer teeth than gear teeth 128 or 129. At the right end of pinion 123 are shown a thrust washer 132 and a sleeve bearing 133. An outer housing 136 is secured to cap 108 and to an output retainer housing 138 by a multiplicity of shoulder screws 139 which pass through appropriately positioned and sized holes in housing 136 and into threaded blind holes in retainer housing 138. In outer housing 136, which is made as a ring, there are formed on the inner extent two gear portions 143 and 144. These gears have configurations that are identical to gears 128 and 129. At the left end of gear teeth 143 there is provided a relief 146 which is also provided for forming the mating teeth 128 in the pinion spool 123. Between the gear segments 143 and 144 is a relief 145 on both the pinion and outer housing 136. It is also to be noted that housing 136 is formed with fins 147 which assist in the dissipation of developed heat.

The retainer housing 138 is also formed with outwardly-extending fins 148 similar to, if not identical, to fins 147 on outer housing 136. Means 149 for securing a static torque arm is also provided in this retainer housing 138. This housing, which is ring-like, has a finished diametrical surface for needle-bearing rollers 151 and a smaller diametrical surface for needle-bearing rollers 152. An output shaft 154 has an inwardly-directed gear 155 which is adapted to mate with gear 126 formed on the pinion spool. A thrust washer 157 is disposed between normally disposed shoulder portions of housing 138 and the output shaft 154. An O-ring 158 provides a lubricating seal between the rotational movement of the output shaft 154 and housing 138. There is also depicted a collar and set screw 160 and 161 by which a driven shaft may be secured in a bored recess 164 in the output shaft.

USE AND OPERATION OF COUPLING OF FIG. 5

In the embodiment depicted in FIG. 5, it is assumed that the device is substantially in the rotational position of FIG. 4C in that the gear teeth 128, 129 and 130 are at least partly, if not substantially, disengaged from the mating gear portions 143, 144 and 155. The interior of this reducer is substantially filled with lubricating oil, with O-rings 103 and 158 providing needed sealing means. It is to be noted that at other mating joints there are sealing rings or means indicated, if not identified. These joints are potential sources of leakage so sealing means is provided. The fins 147 and 148 are provided so as to dissipate heat developed within the apparatus. It is to be noted that the eccentric portions 116 and 117 cause the rollers 118 and 119 to maintain the balance weight 121 from engaging the interior of pinion spool 123. The actuation of this apparatus is essentially that as described above in FIGS. 4A through 4H. The eccentric portions 116 and 117 are between input shaft 85 (FIG. 4A) and rollers 84 (FIG. 4A) as described above.

DIAGRAMMATIC SHOWING OF FIGS. 6A THROUGH 6E

Finally there is illustrated in a diagrammatic manner the conventional eccentric actuation and that as provided by the apparatus of this invention. In FIGS. 6A and 6B, an eccentric actuation as found in the "prior art" is shown. In FIG. 6B, gear portions 170 and 171 formed on the exterior surface of a pinion 172 are carried on bearings 173 and 174 and transcribe paths 176 and 177. Shown on FIGS. 6A and 6B are arrows indicating bearing reaction forces when the pinion spool is rotated. In FIG. 6A there is shown diagrammatically the separating force at the pitch line of the meshing gears both with track 176 for orbit path of gear 170 and orbit path 177 for gear 171.

In FIGS. 6C, 6D and 6E, the dynamic beam provided by the pinion spool of this invention is shown. As diagrammatically illustrated, the pinion spool has gears 180 and 181 on and of the larger diameter and gear 182 on and of the smaller diameter of the spool. Gears 180 and 181 transcribe orbit path 184 and gear 182 transcribes orbit path 185.

The equations and diagrams of FIGS. 6C, D and E illustrate the resultant forces developed by the pinion beam. The pinion spool of the preferred and alternate configuration has two separate rows of gear teeth at the larger diameter of the spool. The smaller diameter gear of the spool drives the output shaft and produces the same reactant force as in FIG. 6B. The provision of making this pinion spool as a beam raises the efficiency of the reducer and, more importantly, reduces the gear tooth wear and the heat levels without the use of ancillary bearing means. This condition is particularly prevalent where reductions have high ratios such as one hundred to one or greater.

The above description and drawings are believed to provide a basis for a method of constructing members and assembling a geared ratio reducer coupling for receiving an input force and rotational speed from an external power source and by an internal gear arrangement reducing the input shaft speed to a determined output speed, this method including the steps of:

forming an input shaft so as to receive an input force and be rotated at the same speed as the input force;

forming and mounting an eccentric means on the input shaft and rotating said eccentric means with the rotation of said input shaft;

forming a metal floating pinion spool which is adapted to be orbited in a circular path and eccentrically moved as the eccentric means is rotated and forming on said pinion spool first and second ring-like gear row portions of outwardly, like-shaped extending gear teeth, with each of the first and second gear portions having the same number of teeth, and forming the outer peripheral surface of this pinion with a spaced relief between the first and second rows providing a fluid pathway and accumulating means, and forming on said pinion a third extending row of gear teeth on this pinion spool having a common center line which is a selected distance offset from the center line of the input shaft;

providing an outer fixed housing having two rows of inwardly-extending gear teeth and having a pitch and shape to mate with and engage the first and second rows of gear teeth on the pinion spool, these two rows having a like number of teeth that are greater than the number of teeth as provided on the pinion spool;

providing a metal output shaft and shaping said output shaft so as to be freely turning and independent of the outer housing in which it is rotated and carrying this output shaft by at least two anti-friction bearing assemblies mounted in said fixed housing, and providing and forming a row of inwardly-extending gear teeth on the output shaft, said row of teeth having a configuration to mate with the third row of teeth on the floating pinion, the number of teeth on said output shaft less than the number of teeth in the gear teeth in the two rows in said fixed housing.

Terms such as "left," "right," "up," "down," "bottom," "top," "front," "back," "in," "out," "clockwise," "counterclockwise" and the like are applicable to the embodiments shown and described in conjunction with the drawings. These terms are merely for the purposes of description and do not necessarily apply to the position in which the geared ratio reducer coupling may be constructed or used.

While particular embodiments of the geared ratio coupling have been shown and described, it is to be understood that the invention is not limited thereto, and protection is sought to the broadest extent the prior art allows.

What is claimed is:

1. A geared ratio reducer coupling for receiving an input force and rotational speed from an external power source and by an internal gear arrangement reduce an input shaft speed to a determined output speed, this ratio coupling including:

(a) an input shaft and means to receive and rotate said shaft in response to input power;

(b) an eccentric means driven by the input shaft and rotated at the same speed as and with the input shaft;

(c) a floating pinion spool adapted to be orbited in a circular path and eccentrically moved as the eccentric means is rotated, said pinion spool having first and second ring-like gear row portions of outwardly, like-shaped extending gear teeth, with each of the first and second gear portions having the same number of teeth, and with this pinion also having at least one spaced relief between the first and second rows providing a fluid pathway and accumulating means, said pinion also having a third extending row of gear teeth with a different number of teeth than said first and second rows, the first, second and third rows of gear teeth on this pinion spool having a common center line which is a selected distance offset from the center line of the input shaft;

(d) an outer fixed housing which includes a housing cap adapted to receive and retain said input shaft; a central portion having two rows of inwardly-extending gear teeth having a pitch and shape to mate with and engage the first and second rows of gear teeth on the pinion spool, these two rows having a like number of teeth that is greater than the number of teeth as provided on the pinion spool, said outer housing having means to rotatably retain an output shaft on the same center line as the input shaft, said housing having at least in part external fins adapted to dissipate heat generated by the operation of said geared ratio reducer coupling;

(e) means for arraying said output shaft as freely turning and independent of the outer fixed housing by which it is carried, this output shaft carried by at least two anti-friction bearing assemblies mounted in said fixed housing;

(f) means for making the assembled outer housing substantially oil-tight and within said housing providing a determined quantity of gear lubricating fluid, and during actuation of said gear ratio reducer coupling causing said lubrication to flow inwardly and outwardly through apertures provided in the floating spool, with one array of apertures extending through and in communication with the spaced relief in the floating pinion spool, and (g) a row of inwardly-extending gear teeth carried on the output shaft, the row of teeth having a configuration to mate with the third row of teeth on the floating pinion, the number of teeth on said output shaft greater or less than the number of teeth in the two rows in said fixed housing, which housing in an assembled condition is maintained by a plurality of screws an the like.

2. A geared ratio reducer coupling for receiving an input force and rotational speed from an external power source and by an internal gear arrangement reduce an input shaft speed to a determined output speed, this ratio coupling including:

(a) an input shaft and means to receive and rotate said shaft in response to input power;

(b) an eccentric means driven by the input shaft and rotated at the same speed as and with the input shaft;

(c) a floating pinion spool adapted to be orbited in a circular path and eccentrically moved as the eccentric means is rotated, said pinion spool having first and second ring-like gear row portions of outwardly, like-shaped extending gear teeth, with each of the first and second gear portions having the same number of teeth, and with this pinion also having at least one spaced relief between the first and second rows providing a fluid pathway and accumulating means, said pinion also having a third extending row of gear teeth but with fewer teeth; the first, second and third rows of gear teeth on this pinion spool having a common center line which is a selected distance offset from the center line of the input shaft;

(d) an output shaft which is freely turning and independent of an outer fixed housing by which it is carried, this output shaft carried by at least two anti-friction bearing assemblies mounted in said fixed housing;

(e) the outer housing, at least in part, provided with external fins adapted to dissipate heat generated by the operation of the ratio coupling, having two rows of inwardly-extending gear teeth and having a pitch and shape to mate with and engage the first and second rows of gear teeth on the pinion spool, these two rows having a like number of teeth that are greater than the number of teeth as provided on the pinion spool, this outer housing including a housing cap adapted to receive and retain the input shaft, with a central portion having the two rows of inwardly-extending gears adapted to engage the first and second rows of gears on the floating pinion spool, and an output body housing having means to rotatably retain an output shaft on the same center line as the input shaft, and a plurality of shoulder screws adapted to assemble and maintain these housing portions in an assembled condition;

(f) a row of inwardly-extending gear teeth carried on the output shaft, the row of teeth having a configuration to mate with the third row of teeth on the floating pinion, the number of teeth on said output shaft less than the number of teeth in the gear teeth in the two rows in said fixed housing, and (g) a retained lubrication seal disposed at the end for the entrance of the input shaft and another retained lubrication seal at that end of the housing from which the output shaft extends.

3. A geared ratio reducer coupling as in claim 2 in which the assembled housing is made substantially oil-tight and within the housing of the reducer coupling there is provided a determined quantity of gear lubrication fluid.

4. A geared ratio reducer coupling as in claim 2 in which the housing is maintained in fixed position by a static torque arm and securing means, and in which the input force is provided by a shaft whose distal end is secured in a sleeve retainer which is associated with a flexible coupling having its other end connected to and driving one end of the input shaft.

5. A geared ratio reducer coupling as in claim 4 in which the sleeve retainer is closed at its inner end to provide a fluid-tight closure.

* * * * *